United States Patent
Chiu et al.

(10) Patent No.: US 7,742,751 B2
(45) Date of Patent: Jun. 22, 2010

(54) FILTER SCHEME FOR RECEIVER

(75) Inventors: Scott Chiu, Folsom, CA (US); Issy Kipnis, Berkeley, CA (US); Jan Rapp, Hasselby (SE); David Westberg, Balsta (SE)

(73) Assignee: Intel Corporation, Santa Clara, CA (US)

( * ) Notice: Subject to any disclaimer, the term of this patent is extended or adjusted under 35 U.S.C. 154(b) by 621 days.

(21) Appl. No.: 11/613,986

(22) Filed: Dec. 20, 2006

(65) Prior Publication Data

US 2008/0150689 A1     Jun. 26, 2008

(51) Int. Cl.
    *H04B 1/26* (2006.01)
(52) U.S. Cl. .................. 455/313; 455/307; 455/334
(58) Field of Classification Search .......... 455/307, 455/313, 334
    See application file for complete search history.

(56) References Cited

U.S. PATENT DOCUMENTS

| | | | |
|---|---|---|---|
| 5,451,958 A * | 9/1995 | Schuermann | 342/42 |
| 6,442,380 B1 * | 8/2002 | Mohindra | 455/234.1 |
| 7,139,542 B2 * | 11/2006 | Vepsalainen et al. | 455/266 |
| 7,171,185 B2 * | 1/2007 | Matsumoto et al. | 455/324 |
| 7,197,279 B2 * | 3/2007 | Bellantoni | 455/41.2 |
| 7,477,885 B2 * | 1/2009 | Rostami et al. | 455/284 |
| 7,499,692 B2 * | 3/2009 | Nakamura et al. | 455/296 |
| 2003/0214423 A1 * | 11/2003 | Lee et al. | 341/118 |
| 2006/0160515 A1 | 7/2006 | Wong | |
| 2007/0004355 A1 | 1/2007 | Kipnis et al. | |
| 2008/0238624 A1 * | 10/2008 | Safarian et al. | 455/73 |
| 2009/0028074 A1 * | 1/2009 | Knox | 370/278 |

FOREIGN PATENT DOCUMENTS

WO     2007002937     1/2007

OTHER PUBLICATIONS

Kakerow, R., M. Mueller, D. Pienkowski, R. Circa, and G. Boeck, "Reconfigurable Receiver Approach for 4G Terminals and Beyond" Proceedings of the 3rd International IEEE-NEWCAS Conference, 2005, pp. 9-12.

* cited by examiner

*Primary Examiner*—Lana N Le
(74) *Attorney, Agent, or Firm*—Konrad Raynes & Victor LLP

(57) ABSTRACT

Provided are a method, system, and device directed to a receive path for a node in a communication system such as a Radio Frequency Identification (RFID) system. In one aspect, the receive path includes a filter operable in multiple modes and configurable to have different bandwidths in the various modes of operation. For example, in one mode, the filter samples a DC component while configured to have a relatively wide bandwidth. As another example, the filter may be operated in another mode to hold the sampled DC component while the filter is configured to have a zero or close to zero bandwidth. As yet another example, the filter may be operated in still another mode to filter received signals and cancel the sampled DC offset from the received signals while configured to have a relatively narrow bandwidth. Additional embodiments are described and claimed.

11 Claims, 6 Drawing Sheets

FILTER SCHEME FOR RECEIVER

BACKGROUND

Radio Frequency Identification (RFID) is a technology used to identify a target object. An RFID system typically includes an information carrying module known as a tag. A tag may include a microchip attached to an antenna and may be packaged such that it can be applied to the target object. The tag receives and transmits signals to and from a reader, most often packaged in the form of a transceiver. The tag may contain a unique serial number as well as other information, such as a customer account number. Tags may be implemented in many forms. For example, a tag may have a barcode label printed thereon, may be mounted inside a carton or may be embedded within the target object.

RFID tags may be implemented as active, passive or semi-passive devices. RFID tags function in response to coded RF signals received from a base station transceiver. An active tag generally includes its own energy supply, such as a battery, that may serve as a partial or complete power source for the tag's circuitry and antenna. Batteries may be replaceable or sealed units. A passive tag is generally powered by the RFID reader itself and thus generally does not contain a battery. It typically communicates by reflecting an incident RF carrier back to the reader. As radio waves from the reader are encountered by a passive RFID tag, a voltage is induced from the antenna. The tag may draw power from the induced voltage to energize its circuits. The tag then transmits the encoded information stored in the tag's memory by backscattering the carrier of the reader. A semi-passive RFID tag typically uses a battery to operate its internal circuitry, but also relies on backscattering communication.

Reading is the process of retrieving data stored on an RFID tag by propagating radio waves to the tag and converting the waves propagating from the tag to the reader into data. Information is transferred as the reflected signal is modulated by the tag according to a particular programmed information protocol. Protocols for RFID tags may be categorized in terms of tag to reader over the air interfaces. Three common interface classes are Class-0 (read-only), Class-1 (read/write), and UHF Generation-2 (read/write), for example. UHF Generation-2 provides some improvement upon existing Class-0 and Class-1 standards for worldwide operation and improved performance, for example. ISO18000 standard series RFID tags cover both active and passive RFID technologies.

A direct conversion based reader has a receive path which down converts the reflected carrier to DC (direct current). FIG. 1 shows an example of a known receive path 10 which includes a high pass filter 12 which removes the reflected carrier DC component from the signal received from the antenna. RF signals from one or more tags may be received at input 14 from an antenna and are provided to an input down-converter 16 comprising an amplifier 18. A local oscillator 20 may be provided to generate frequencies for mixing with the received RF signal in a mixer 22 to perform the down-conversion.

The filter 12 includes a direct current (DC) blocking capacitor 24 which removes the DC component of the baseband signals. After the blocking capacitor 24 removes the DC component, the signals may be amplified by suitable baseband amplifiers and filters as represented by the component 26 and converted to digital signals by suitable analog to digital converters. RFID receivers or transceivers may use one or more receive paths to handle various classes of tags (e.g., Class-0, Class-1, and UHF) in a given environment. RFID receivers or transceivers may use other types receiver circuitry including superheterodyne receivers such as those utilizing a DC or near DC frequency as a second intermediate frequency.

DETAILED DESCRIPTION

In the following description, reference is made to the accompanying drawings which form a part hereof and which illustrate several embodiments. It is understood that other embodiments may be utilized and structural and operational changes may be made without departing from the scope of the descriptions provided.

Figure 2:
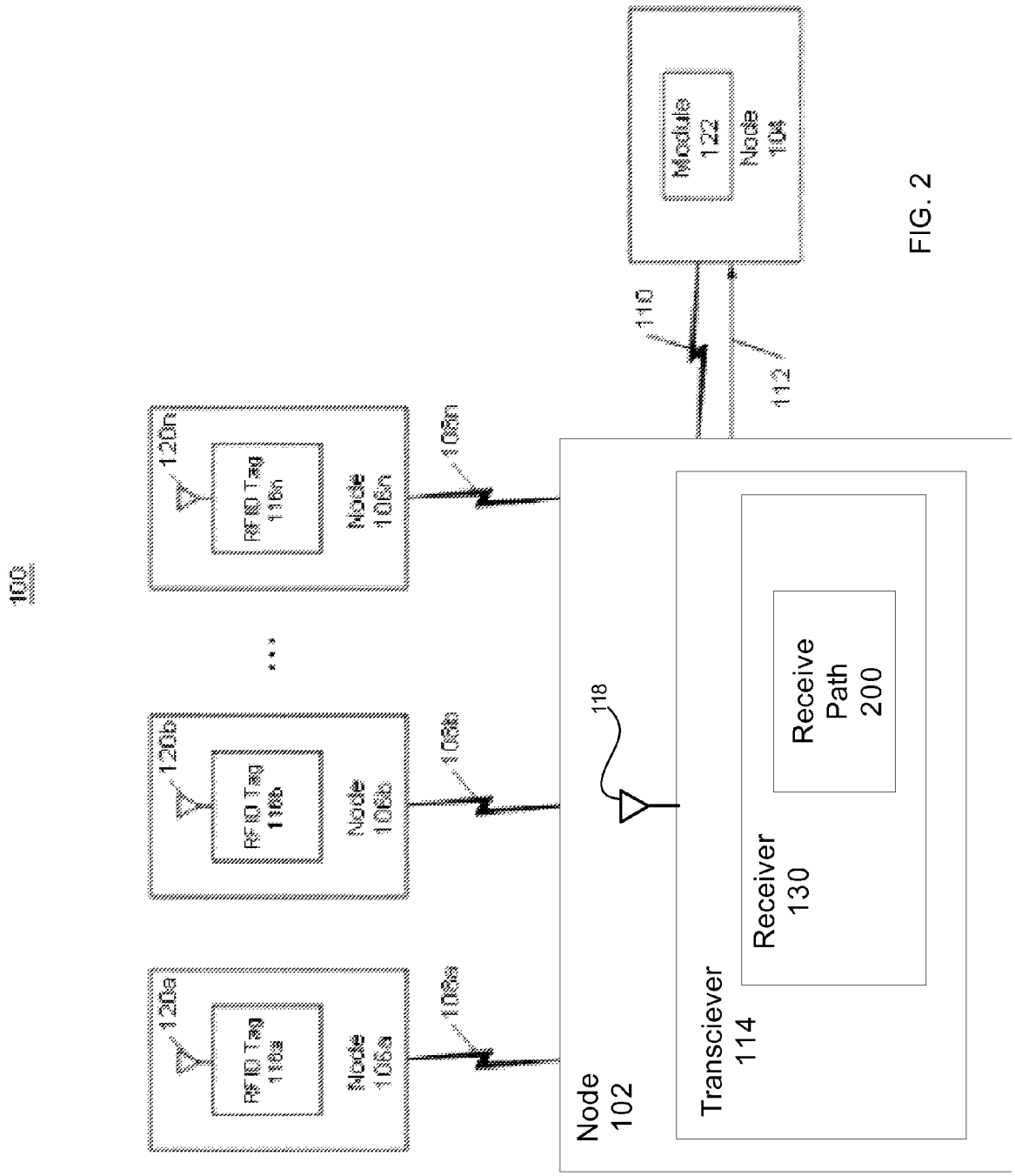
FIG. 2 illustrates one example of an RFID system incorporating a receive path in accordance with one embodiment of the description provided herein.

FIG. 2 illustrates a block diagram of one embodiment of an RFID system 100 which may incorporate one or more of the aspects described herein. System 100 may comprise, for example, a communication system having multiple nodes. A node may comprise any physical or logical uniquely addressable entity in system 100. These nodes may include wireless communication modules such as, for example, RFID tags, as well transceivers for reading and writing information to and from the tags. The RFID tags may have information associated with target objects located throughout system 100. The embodiments are not limited in this context.

The nodes of system 100 may be arranged to communicate different types of information by way of RFID tag protocols. Information exchanged in various embodiments of RFID system 100 may comprise any data associated with target objects. For example, such information may be exchanged through active RFID tags and may comprise data associated with locating, tracking, and safeguarding target objects, including, for example, locating warehouse inventory items, tracking containers with manifest data and safeguarding containers with security type RFID tags, tracking equipment maintenance-parts, tracking vehicles, and locating positions of target objects, for example. Additionally, such information may be exchanged through passive RFID tags and may comprise data associated with accessing target systems such as electronic access control, mobile speed pass at gasoline stations and toll booths, ski pass, luggage tags, passport control, and supply chain item/carton/pallet tracking, among other similar applications, for example. Furthermore, system 100 may comprise, for example, variations and combinations of active and passive RFID tags. Information may comprise data associated with battery assisted passive tags, combined passive (short range) and active (long range) tags, transmit only tags (beacon tag), and real-time locating systems, for example.

The nodes of RFID system 100 may communicate media and control information in accordance with one or more custom or standard protocols. A protocol may comprise a set of predefined rules or instructions to control how the nodes communicate information between each other. As previously discussed, there are several basic forms of over the air interface protocols to enable RFID tag to reader communication, such as, for example, Class-0 (read-only), Class-1 (read/write), and UHF Generation 2 (read/write), among other protocols, for example. The protocol may be defined by one or more protocol standards as promulgated by a standards organization. These may include protocols defined by international RFID standards, such as, International Standards Organization (ISO) RFID standards, International Electrotechnical Commission (IEC) RFID standards, Electronic Product Code (EPC) RFID Standards, International Telecommunications Union (ITU), and Universal Postal Union (UPU) RFID standards, for example. The protocols may be defined by National Standards Organizations, such as American National Standards Institute (ANSI) for the United States, British Standards Institute (BSI) for the United Kingdom, and/or other standards for example. The protocols also may be industrial or proprietary custom protocols. The embodiments, however, are not limited in this context. It is appreciated that other protocols may be used, depending upon the particular application.

Portions of RFID system 100 may be implemented as a wired communication system, a wireless communication system, or any combination thereof. Although system 100 may be illustrated using a particular communications media by way of example, it may be appreciated that the principles and techniques discussed herein may be implemented using any type of RFID communication media and accompanying technology. The embodiments, however, are not limited in this context.

When implemented as a wireless system, system 100 may include one or more wireless nodes comprising wireless communication modules, such as, for example, RFID tags, interrogators, transceivers, and the like. These wireless nodes may be arranged to communicate information over one or more types of wireless communication media. An example of a wireless communication media may include portions of a wireless spectrum, such as the radio-frequency (RF) spectrum. The wireless nodes may include components and interfaces suitable for communicating information signals over a designated wireless spectrum, such as one or more antennas, wireless transmitters/receivers ("transceivers"), amplifiers, filters, control logic, and so forth. Examples for the antenna may include an internal antenna, an omni-directional antenna, a monopole antenna, a dipole antenna, a lead-frame antenna, an end-fed antenna, a circularly polarized antenna, a patch antenna, a plane-inverted F antenna, a micro-strip antenna, a diversity antenna, a dual antenna, an antenna array, and so forth. The embodiments are not limited in this context. It is appreciated that other types of antennas may be used, depending upon the particular application.

Referring again to FIG. 2, RFID system 100 may comprise nodes 102, 104, 106a-106n, for example. Although FIG. 2 is shown with a limited number of nodes arranged in a certain topology, it may be appreciated that system 100 may include additional or fewer nodes arranged in any topology desired for a given implementation. Node 102 may communicate with nodes 106a-106n via RFID wireless communication links 108a-108n. In addition node 102 may communicate with node 104 via wireless communication link 110, wired link 112, or any combination thereof, for example. In one embodiment, wireless communication link 110 also may comprise a wireless RFID link, for example. In one embodiment, transceiver 114 communicates with module 122. In one embodiment, module 122 may comprise a wireless device such as an RFID tag, wireless telephone (e.g., cellular telephone), computer, wireless device, cellular telephone or any other wired or wireless communication device described herein. The embodiments are not limited in this context.

In one embodiment, RFID system 100 may comprise node 102. Node 102 may comprise, for example, an RFID reader comprising a communication element. Among other elements and functions, the communication element may include a wireless transceiver 114, for example, to communicate between node 102 and nodes 106a-106n, for example. In one embodiment, transceiver 114 may comprise antenna 118 and may be configured to communicate with one or more wireless modules, such as, for example, RFID tags 116a, 116b, 116n at nodes 106a, 106b, 106n, respectively, for example. Each RFID tag 116a, 116b, 116n comprises an antenna 120a, 120b, 120n, respectively.

RFID tags 116a-116n may communicate with node 102 by way of multiple over the air interface protocols, for example. In one embodiment, RFID tags 116a-116n may comprise any one of or any combination of Class-0 (read-only), Class-1 (read/write), UHF Generation 2 (read/write), and ISO18000 classes of RFID tags discussed above, among other RFID tag classes, for example. In one embodiment, RFID tags 116a-116n may comprise active, passive, and/or semi-passive RFID tags, for example.

In general operation, RFID system 100 may comprise an RFID system to dynamically track and monitor target objects located therein. In one embodiment, system 100 may communicate information between node 102 and node 104, and between node 102 and nodes 106a-106n, at any time, and simultaneously read and write information from and to RFID tags 116a-116n, respectively. For example, transceiver 114 may read and write information from and to RFID tags 116a-116n to track target objects such as serial numbers of target objects and components contained therein.

In one embodiment, transceiver 114 may comprise a receiver 130, for example, to read information from RFID tags, for example. In one embodiment, receiver 130 may comprise a receive path 200 to perform direct down-conversion of baseband RFID tag signals and remove the reflected carrier DC component from the signal received from the antenna 118. It is appreciated that other architectures may be used to convert received power.

In one example, the transmitted power may exceed one watt and the coupling of the receiver 130 may be high, such as 15 dBm, for example. It is appreciated that other power transmission and coupling levels may be used, depending upon the particular application.

In one embodiment, receiver 130 may comprise a baseband Analog to Digital Converter (ADC) for single or multiple classes of RFID. The ADC may be, for example, a complex ADC. In one embodiment, one ADC may be provided to receive an in-phase (I) signal component and one ADC may be provided to receive a quadrature (Q) signal component. Other arrangements may be utilized for analog to digital conversion, depending upon the particular application.

Figure 3:
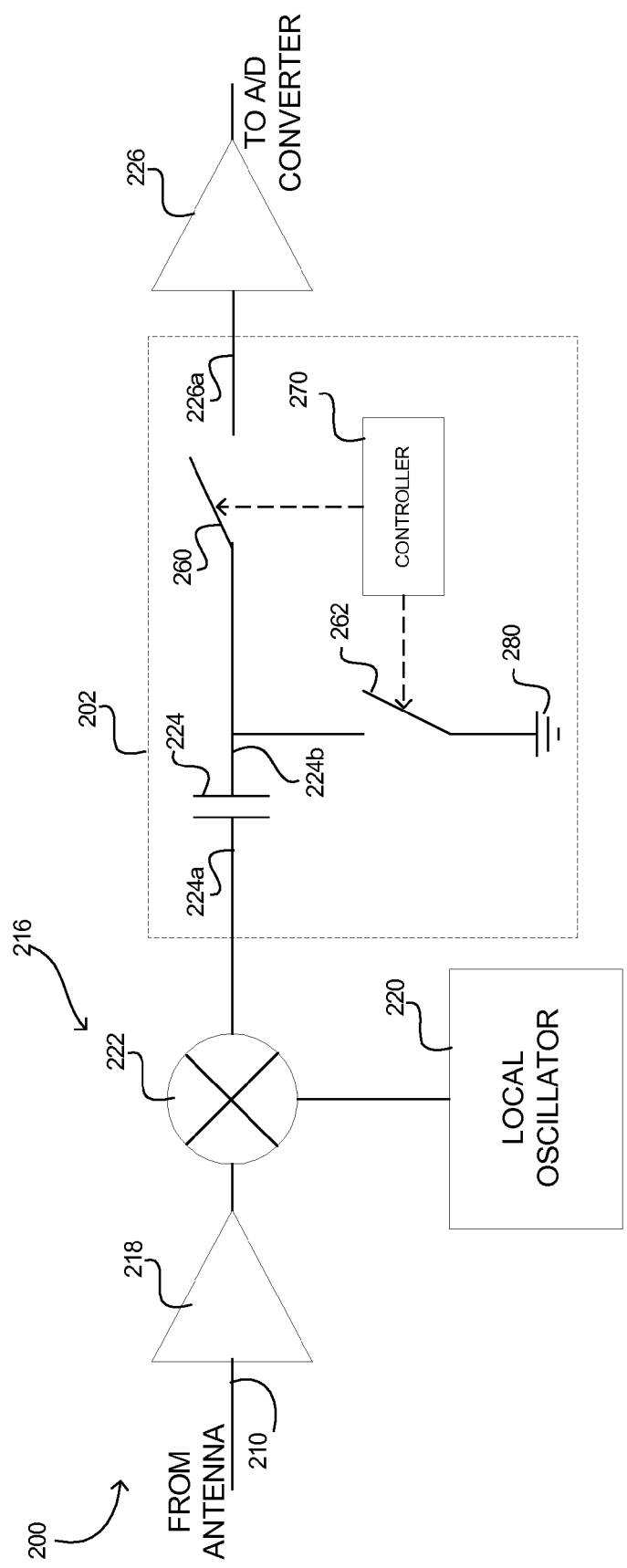
FIG. 3 is a schematic diagram of a receive path for an RFID system in accordance with one embodiment of the description provided herein.

FIG. 3 is a schematic diagram of one embodiment of the receive path 200. As described in greater detail below, and in accordance with one aspect of the present description, the receive path 200 includes a filter 202 which is operable in multiple modes and is configurable to have different bandwidths in the various modes of operation. For example, in one mode, the filter 202 samples the DC component while configured to have a relatively wide bandwidth. Such a relatively wide bandwidth can facilitate a variety of operations including facilitating a relatively rapid settling time for sampling purposes.

As another example, the filter 202 may be operated in another mode to hold the sampled DC component while the filter 202 is configured to have a zero or close to zero bandwidth. Such a configuration can facilitate maintaining the held DC component for subsequent offsetting operations.

As yet another example, the filter 202 may be operated in still another mode to filter received signals and cancel the sampled DC offset from the received signals while configured to have a relatively narrow bandwidth. Such a relatively narrow bandwidth can facilitate proper filtering of the received signals, particularly where the received signals may include significant data at close to DC. It is appreciated that a multi-mode, multi-bandwidth filter such as the filter 202 may be operated in a variety of other modes and other bandwidths to achieve various results, depending upon the particular application.

Figure 1:
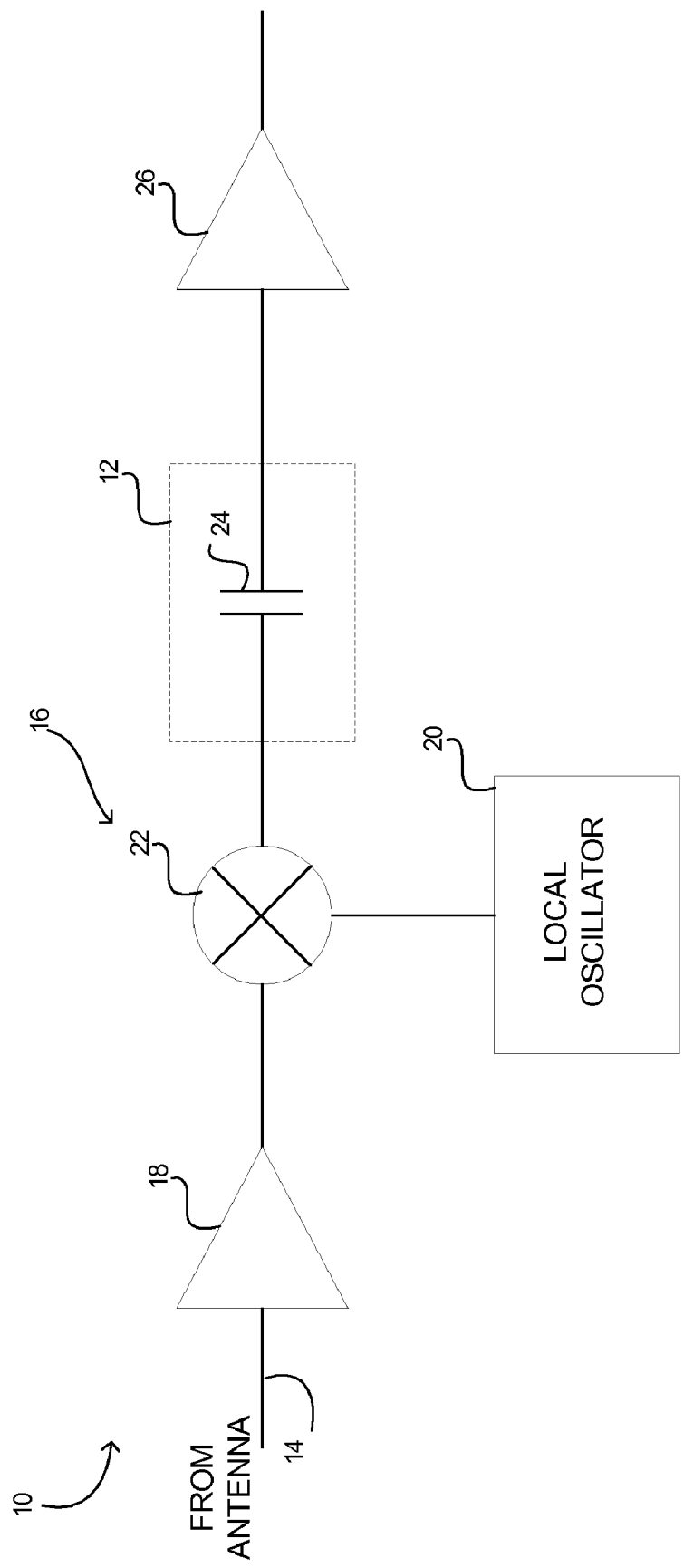
FIG. 1 is a prior art example of a receive path of an RFID reader.

RF signals from RFID tags may be received at input port 210 and are provided via an amplifier 218 to an input downconverter 216 comprising a local oscillator 220 and a mixer 222. The input port 210, downconverter 216, amplifier 218, local oscillator 220 and mixer 222 may be the same as or different from the input port 10, downconverter 16, amplifier 18, local oscillator 20 and mixer 22 of FIG. 1, depending upon the particular application. In one example, the local oscillator 220 may generate in-phase (I) and quadrature (Q) frequencies for mixing to perform a down-conversion. The frequencies may be set at various frequencies such as an Ultra High Frequency (UHF) frequency such as 900 MHz, for example, depending upon the particular application. It is appreciated that the frequencies and phases of signals used to perform a down conversion may vary, depending upon the particular application. It is further appreciated that, in various embodiments, there may be one or more mixers, which may be implemented as half-complex mixers, full-complex mixers, among others, as appropriate, depending upon the particular application.

In one embodiment Class-1 RFID tags have a baseband information bandwidth of <1 MHz and thus receiver 130 may comprise a direct down-conversion portion. In another embodiment Class-0 RFID tags may be subcarrier modulated at substantially 2.25 and 3.25 MHz. In a direct conversion architectures for Class-0 RFID tag signals, baseband filters and ADCs may have substantially 3.3 MHz bandwidths, for example. It is appreciated that other modulation frequencies and bandwidths for baseband filters and ADCs may be utilized, depending upon the particular application.

After the filter 202 removes the DC component, the signals may be amplified by suitable baseband amplifiers and filters as represented by the component 226 and converted to digital signals by suitable analog to digital converters. RFID receivers or transceivers may utilize one or more receive paths similar to the path 200 to handle various classes of tags (e.g., Class-0, Class-1, and UHF) in a given environment.

In the illustrated embodiment, the filter 202 includes a capacitor 224 which is coupled at one end 224a to the output of the mixer 222 of the downconverter 216. The filter 202 further includes plurality of switches 260, 262 which are controlled by a controller 270. The switch 262 when closed by the controller 270 electrically shunts the other end 224b of the capacitor 224 to a low impedance 280 such as ground, for example. Such a configuration can provide the filter 202 a relatively wide bandwidth to facilitate sampling a DC component of received and down converted signals, for example. It is appreciated that the capacitor 224 of the filter 202 may be shunted to other impedances, depending upon the particular application. Although this shunting operation is illustrated as being performed by a single switch 262, it is appreciated that a number of switches may be used in various configurations, depending upon the particular application.

The controller 270 may include logic implemented in hardware, software, firmware or a combination thereof. Suitable controllers include software programmed general purpose processors and application specific integrated circuits (ASIC) devices, for example. Other types of devices both dedicated and programmed, may be utilized, depending upon the particular application.

After sampling the DC component of received and down converted signals, the controller 270 can open both switches 260 and 262, decoupling the end 224b of the capacitor 224 from other signal paths such as the low impedance 280 and the input 226a of the amplifiers 226. As a consequence, the end 224b of the capacitor 224 is coupled to an extremely high if not infinite impedance. Such a configuration can provide the filter 202 a bandwidth close to or equal to zero to facilitate holding the sampled DC component of received and down converted signals, for example. It is appreciated that the capacitor 224 of the filter 202 may be configured to have other bandwidths when holding a sampled DC component, depending upon the particular application. Although this decoupling operation is illustrated as being performed by a pair of switches 260, 262, it is appreciated that a number of switches may be used in various configurations, depending upon the particular application.

In yet another example of the configuration of the filter 202, the shunt switch 262 may be opened by the controller 270 and the switch 260 closed by the controller 270 to electrically couple the end 224b of the capacitor 224 in series to the input 226a of the amplifiers 226 (and subsequent analog to digital converter or converters (not shown)). In this configuration, the filter 202 may filter received signals and cancel the sampled DC offset from the received signals. In this example, the input 226a of the amplifiers 226 has an impedance intermediate that of the low impedance 280 on the one hand and an open circuit on the other. As a consequence, in this configuration, the filter 202 may have a relatively narrow bandwidth which may facilitate, for example, the reduction or elimination of improper filtering of low frequency signals, for example. Although this series coupling operation is illustrated as being performed by a pair of switches 260, 262, it is appreciated that a number of switches may be used in various configurations, depending upon the particular application.

The receive path is described herein in one embodiment as being used in a direct conversion receiver. It is appreciated that a receive path in accordance with the description provided herein may be used in RFID receivers or transceivers having a variety of different receiver designs including superheterodyne receivers such as those utilizing a DC or near DC frequency as a second intermediate frequency.

Figure 4:
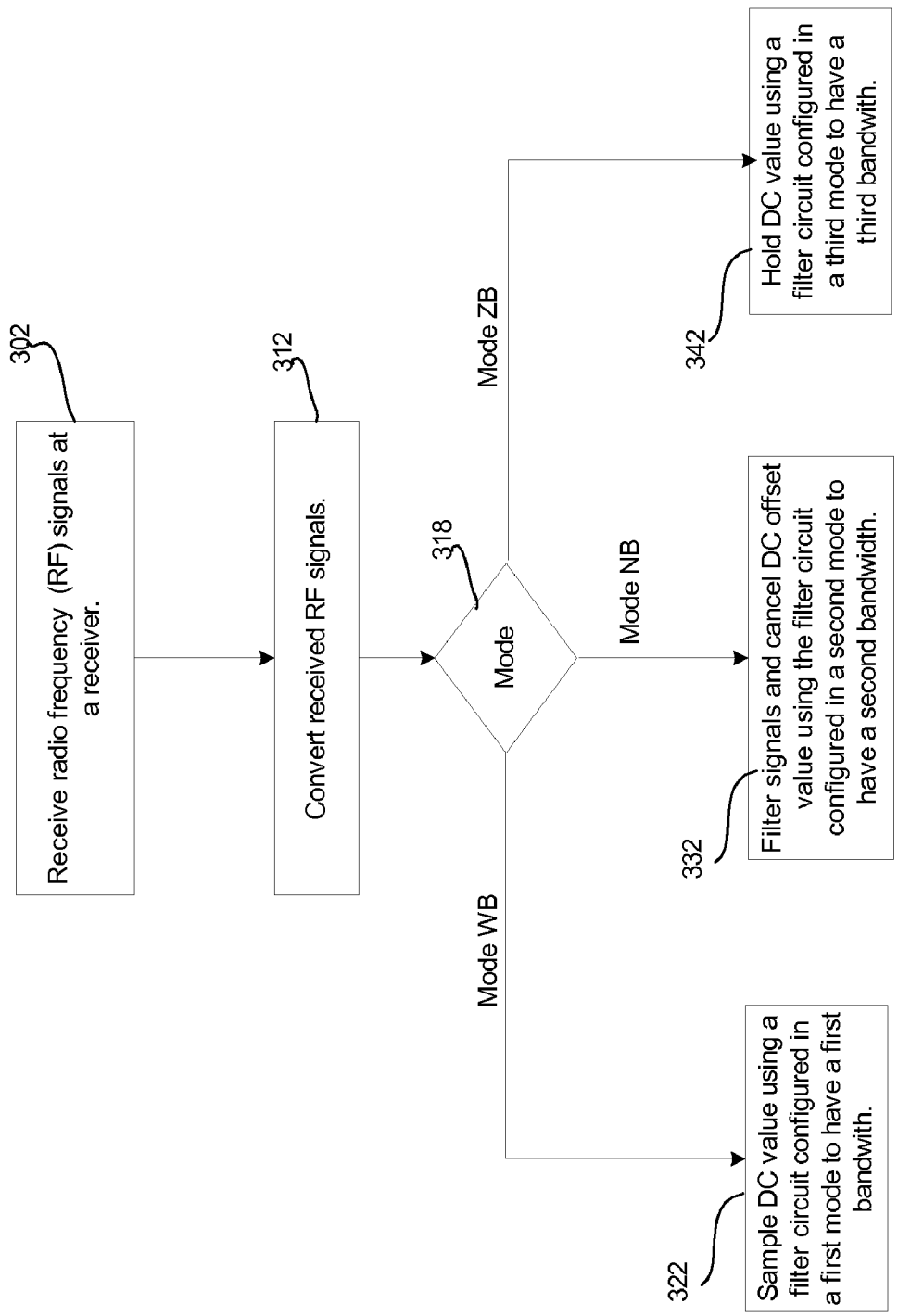
FIG. 4 illustrates operations of one embodiment of the receive path of FIG. 3.

FIG. 4 illustrates one example of operations of a receiver having a receive path such as the receive path 200 in accordance with the present description. In one operation, radio frequency (RF) signals are received (block 302) at a receiver such as the receiver 200 (FIG. 2) of a node such as node 102 which may be an RFID reader, for example. RF signals may be received in a variety of phases of operation of a communication element such as a reader. For example, during an initialization period, an unmodulated RF carrier signal may be transmitted by a transceiver 114 to one or more tags such as an RFID tag 116a. Passive RFID tags may be powered by the RF carrier transmitted to the tag by the reader. The powered RFID tag can generate a response to the reader by reflecting or back scattering the transmitted power from the reader. Thus, the reader can transmit a continuous wave of unmodulated RF power and concurrently receive the tag reply. It is appreciated that in other applications, devices may be initialized using modulated as well as unmodulated initialization signals and replies may be transmitted at the same or different time as the initialization signals are transmitted.

The reply signals received by the reader from the tag may be converted (block 312) by suitable conversion circuitry such as the downconverter 216 illustrated in FIG. 3. As previously mentioned, the downconverter 216 down converts the reflected unmodulated carrier to a DC (direct current) signal.

As set forth above, the filter circuit 202 may be configured in one of a variety of modes. Depending upon the mode (block 318), in another operation, the DC value of the DC portion of the signal from the tag may be sampled (block 322) by a sample circuit such as the filter circuit 202 of the receive path 200 as described above. The filter circuit 202 may be configured in one mode (referred to as mode WB in FIG. 4) to provide the filter 202 a relatively wide bandwidth to facilitate sampling a DC component of received and down converted signals, for example. In one embodiment, the switch 262 when closed by the controller 270 electrically shunts the other end 224b of the capacitor 224 to a low impedance 280 such as ground to provide a relatively high corner frequency and wide bandwidth for the filter 202. In one example, the bandwidth of the filter 202 is maximized for the impedance of the capacitor 224. It is appreciated that other bandwidths may be utilized for sampling, depending upon the particular application.

Such a variable bandwidth capability may have a variety of applications. For example, when the reader changes phases of operation from transmitting data to the tag to prepare for receiving data from the tag, the sampled DC value may be permitted by the filter 202 (which has been configured to have a wide bandwidth), to converge relatively rapidly as the reader switches from transmitting a modulated carrier to transmitting the unmodulated carrier. As a consequence, the accurate and rapid DC sampling of the reflected tag reply may be facilitated. In Class 0 operation, for example, the reader may switch between transmit and receive on a bit by bit basis. Hence, rapid convergence may be of particular usefulness in such applications. It is appreciated that other aspects may be utilized of such a capability, depending upon the particular application.

As previously mentioned, RF signals may be received (block 302) in a variety of phases of operation of a communication element such as a reader. In another example, during a data receive period, an unmodulated RF carrier signal may again be transmitted by the transceiver 114 to one or more tags such as an RFID tag 116a. As set forth above, passive RFID tags may be powered by the RF carrier transmitted to the tag by the reader. Again, the powered RFID tag can generate a response to the reader by reflecting or back scattering the transmitted power from the reader. However, the tag can modulate the signal received from the reader, to transmit data back to the reader on the reflected signal. Thus, the reader can transmit a continuous wave of unmodulated RF power and concurrently receive the tag reply data. It is appreciated that in other applications, devices may be powered during a data receive phase using modulated as well as unmodulated power signals and data replies may be transmitted at the same or different time as the power signals are transmitted.

The reply data signal received by the reader from the tag may again be converted (block 312) by suitable conversion circuitry such as the downconverter 216 illustrated in FIG. 3. The downconverter 216 down converts the reflected carrier to a DC (direct current) signal combined with the data signals from the tag.

In another operation, a filter circuit such as the filter 202 filters (block 332) the down converted reply data signals from the tag and cancels the DC offset value which was sampled from the unmodulated tag reply signal. As described above, the filter circuit 202 may be configured in another mode (mode NB, for example) to provide the filter 202 a relatively narrow bandwidth which may facilitate, for example, the reduction or elimination of improper filtering of low frequency signals, for example. In this embodiment, the input 226a of the amplifiers 226 has an impedance intermediate that of the low impedance 280 on the one hand and an open circuit on the other. The switch 260 when closed by the controller 270 electrically couples the other end 224b of the capacitor 224 to the intermediate impedance of the input 226a of the amplifiers 226. As a consequence, in this configuration, the filter 202 may have a relatively low corner frequency and a relatively narrow bandwidth for the filter 202. In one example, the DC filter bandwidth may be configured to be less than 1 KHz to reduce or eliminate impacting low frequency signal content, particularly in those RFID protocols which support very low data rate modulations. It is appreciated that other bandwidths may be utilized for filtering and canceling, depending upon the particular application.

Such a capability can have a variety of applications. For example, when the reader is receiving data, the high pass filtering corner may be selected to be low enough to avoid inadvertently filtering valid data in the tag reply. In many applications, the tag modulation of the reflected signal to encode data typically does not include DC content. However, certain low data rate modes may have significant signal data content which is at a modulation frequency relatively close to DC (such as signals less than 10 KHz, for example.) It is appreciated that other aspects may be utilized of such a capability, depending upon the particular application.

In yet another example, during a data transmission period, a modulated RF carrier signal may be transmitted by the transceiver 114 to transmit data to one or more tags such as an RFID tag 116a. In some readers, reply signals received by the reader from the tag during data transmission by the transceiver 114 may not carry useful information. The filter circuit 202 may be configured in another mode (mode ZB, for example) which functions to hold (block 342) the sampled DC offset value while the transceiver transmits data to the tag. In this mode, the controller 270 can open both switches 260 and 262, decoupling the end 224b of the capacitor 224 from other signal paths such as the low impedance 280 and the input 226a of the amplifiers 226. As a consequence, the end 224b of the capacitor 224 has an extremely high if not infinite impedance. Such a configuration can provide the filter 202 a bandwidth close to or equal to zero to facilitate holding the sampled DC component of received and down converted signals, for example. It is appreciated that other bandwidths may be utilized for holding functions, depending upon the particular application.

In addition, in this mode, the input 226a receives little or no changes due to the transmission of data by the transceiver. Thus, any signals received (block 302) from a tag or converted (block 312) during the transceiver data transmission mode may be blocked, either completely or substantially, while the sampled DC offset is held for the next DC offset cancellation operation (block 332). It is appreciated that other aspects may be utilized of such a capability, depending upon the particular application. It is further appreciated that in some applications, a hold or blocking function (such as mode ZB, for example) may optionally not be used.

Figure 5:
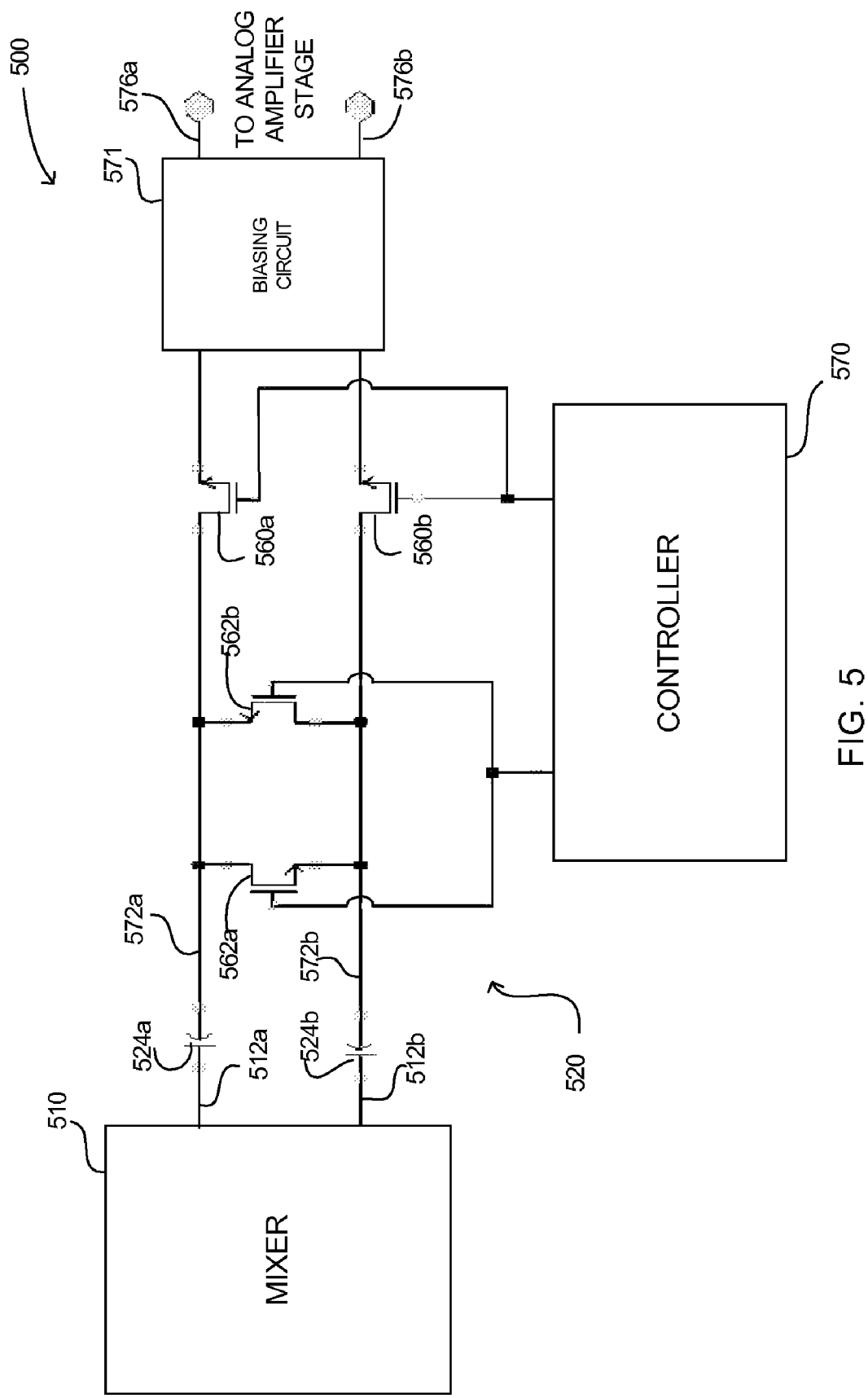
FIG. 5 is a schematic diagram of a portion of a receive path for an RFID system in accordance with another embodiment of the description provided herein.

The receive path 200 discussed above is schematically represented in a single ended implementation. However, it is appreciated that a receive path which includes a filter operable in multiple modes and configurable to have different bandwidths in the various modes of operation may be implemented in a variety of other receive paths. For example, FIG. 5 shows a portion of a receive path 500 which includes a mixer 510 having differential outputs 512a, 512b, and a filter 520 which operates in a manner similar to that of the filter 202 of FIG. 3. The filter 520 includes a pair of capacitors 524a, 52b, each of which is coupled at one end to a respective differential output 512a, 512b of the mixer 222. The filter 520 further includes plurality of switches 560a, 560b, 562a, 562b, which are controlled by a controller 570. In the illustrated embodiment, the switches 560a, 560b, 562a, 562b are implemented with field effect transistors (FETs). A biasing circuit 571 facilitates the operation of the switches 560a, 560b, 562a, 562b. It is appreciated that any suitable device may be used as switches of the filter 520.

The switches 562a, 562b when closed by the controller 570 electrically shunt the other ends 572a, 572b of the capacitors 524a, 524b together, for example. Such a configuration can provide the filter 520 a relatively wide bandwidth to facilitate sampling a DC component of received and down converted signals, for example.

The controller 570, like the controller 270 described above, may include logic implemented in hardware, software, firmware or a combination thereof. Suitable controllers include software programmed general purpose processors and application specific integrated circuits (ASIC) devices, for example. Other types of devices both dedicated and programmed, may be utilized, depending upon the particular application.

After sampling the DC component of received and down converted signals, the controller 570 can open the switches 560a, 560b, 562a, 562b, decoupling the ends 572a, 572b of the capacitors 524a, 524b from other signal paths such as the other capacitor 524a, 524b or the inputs of an analog amplifier stage (not shown). As a consequence, the ends 572a, 572b of the capacitors 524a, 524b are each coupled to an extremely high if not infinite impedance. Such a configuration can provide the filter 520 a bandwidth close to or equal to zero to facilitate holding the sampled DC components of received and down converted signals, for example. It is appreciated that the capacitors 524a, 52b of the filter 520 may be configured to have other bandwidths when holding sampled DC components, depending upon the particular application. Although this decoupling operation is illustrated as being performed by pairs of switches 560a, 560b, 562a, 562b, it is appreciated that other numbers of switches may be used in various configurations, depending upon the particular application.

In yet another example of the configuration of the filter 520, the shunt switches 562a, 562b may be opened by the controller 570 and the switches 560a, 560b closed by the controller 570 to electrically couple the ends 572a, 572b of the capacitors 524a, 524b in series to the inputs of the analog amplifier stage 576b (and subsequent analog to digital converter or converters (not shown)) at outputs 576a. In this configuration, the filter 520 may filter received signals and cancel the sampled DC offsets from the received signals. In this example, the inputs of the analog amplifier stage have an impedance intermediate that of the shunted capacitors 524a, 524b on the one hand and an open circuit on the other. As a consequence, in this configuration, the filter 520 may have a relatively narrow bandwidth which may facilitate, for example, the reduction or elimination of improper filtering of low frequency signals, for example. Although this series coupling operation is illustrated as being performed by pairs of switches 560a, 560b, 562a, 562b, it is appreciated that other numbers of switches may be used in various configurations, depending upon the particular application.

Figure 6:
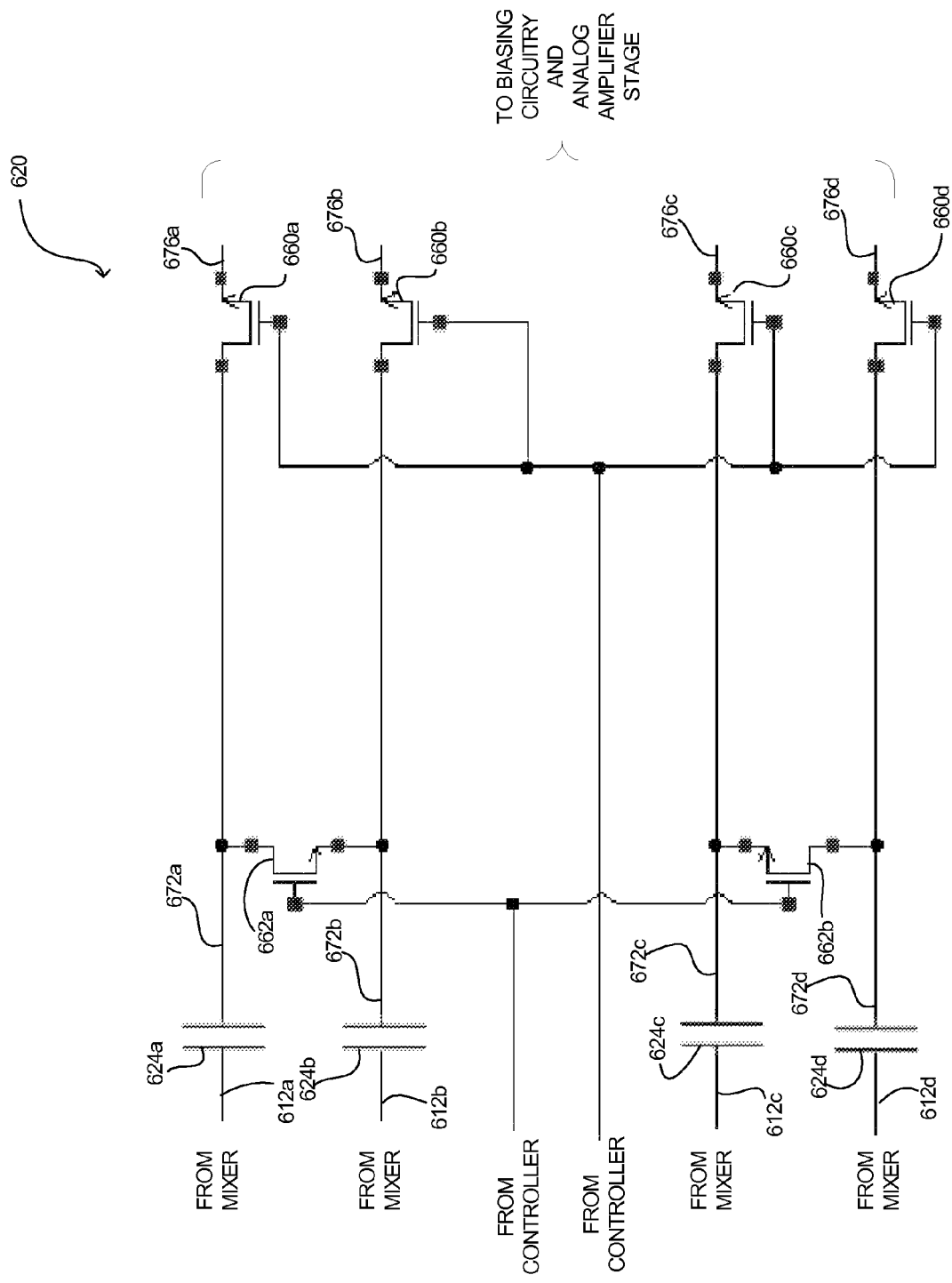
FIG. 6 is a schematic diagram of a portion of a receive path for an RFID system in accordance with yet another embodiment of the description provided herein.

FIG. 6 shows another example of a filter in accordance with the present description. The filter 620 of this example is for a receiver which demodulates and decodes data carrying signals, such as an I-signal and a Q-signal, in quadrature. It is appreciated that data may be encoded and decoded using other suitable encoding/decoding schemes.

In this embodiment, the mixer (not shown) of the receive path has a pair of differential outputs 612a, 612b for a Q-signal, and a pair of differential outputs 612c, 612d for an I-signal. The filter 620 operates in a manner similar to that of the filter 520 of FIG. 5 and includes for the Q-signal, a pair of capacitors 624a, 62b, each of which is coupled at one end to a respective differential output 612a, 612b of the mixer. For the I-signal, a pair of capacitors 624c, 624d are each coupled at one end to a respective differential output 612c, 612d of the mixer.

The filter 620 further includes for the Q-signal, a plurality of switches 660a, 660b, 662a which are controlled by a controller (not shown). For the I-signal a plurality of switches 660c, 660d, 662b are also controlled by the controller. In the illustrated embodiment, the switches 660a, 660b, 660c, 660d, 662a, 662b are implemented with field effect transistors (FETs). A biasing circuit (not shown) facilitates the operation of the switches 660a, 660b, 662a, 662b. It is appreciated that any suitable device may be used as switches of the filter 620.

The switch 662a when closed by the controller electrically shunts the other ends 672a, 672b of the capacitors 624a, 624b together. Such a configuration can provide the filter 620 a relatively wide bandwidth to facilitate sampling a DC component of received and down converted Q-signals, for example. Similarly, the switch 662b when closed by the controller electrically shunts the other ends 672c, 672d of the capacitors 624c, 624d together to provide the filter 620 a relatively wide bandwidth to facilitate sampling a DC component of received and down converted I-signals, for example.

After sampling the DC component of received and down converted Q-signals and I-signals, the controller can open the switches 660a, 660b, 660c, 660d, 662a, 662b, decoupling the ends 672a, 672b of the capacitors 624a, 624b from other signal paths such as the other capacitor 624a, 624b or the inputs of the an analog amplifier stage (not shown). Similarly, the ends 672c, 672d of the capacitors 624c, 624d are decoupled from other signal paths such as the other capacitor 624c, 624d or the inputs of the an analog amplifier stage. As a consequence, the ends 672a, 672b of the capacitors 624a, 624b and the ends 672c, 672d of the capacitors 624c, 624d, are each coupled to an extremely high if not infinite impedance. Such a configuration can provide the filter 620 a bandwidth close to or equal to zero to facilitate holding the sampled DC components of received and down converted Q-signals and I-signals, for example. It is appreciated that the capacitors 624a, 624b, 624c, 624d of the filter 620 may be configured to have other bandwidths when holding sampled DC components, depending upon the particular application. Here too, it is appreciated that other numbers of switches may be used in various configurations, depending upon the particular application.

In yet another example of the configuration of the filter 620, the shunt switch 662a may be opened by the controller and the switches 660a, 660b closed by the controller to electrically couple the ends 672a, 672b of the Q-signal capacitors 624a, 624b in series to the inputs of the analog amplifier stage at outputs 676a, 676b (and subsequent biasing circuit and analog to digital converter or converters (not shown)). Similarly, the shunt switch 662b may be opened by the controller and the switches 660c, 660d closed by the controller to electrically couple the ends 672c, 672d of the I-signal capacitors 624a, 624b in series to the inputs of the analog amplifier stage at outputs 676c, 676d. In this configuration, the filter 620 may filter received signals and cancel the sampled DC offsets from the received Q-signals and I-signals. In this example, the inputs of the analog amplifier stage have an impedance intermediate that of the shunted capacitors 624a, 624b, 624c, 624d on the one hand and an open circuit on the other. As a consequence, in this configuration, the filter 620 may have a relatively narrow bandwidth which may facilitate, for example, the reduction or elimination of improper filtering of low frequency signals, for example. It is appreciated that other numbers of switches may be used in various configurations, depending upon the particular application.

Additional Embodiment Details

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention. Further, although process operations, method operations, algorithms or the like may be described in a sequential order, such processes, methods and algorithms may be configured to work in alternate orders. In other words, any sequence or order of operations that may be described does not necessarily indicate a requirement that the operations be performed in that order. The operations of processes described herein may be performed in any order practical. Further, some operations may be performed simultaneously or omitted or added.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article. The functionality and/or the features of a device may be alternatively embodied by one or more other devices which are not explicitly described as having such functionality/features. Thus, other embodiments of the present invention need not include the device itself.

The described operations may be implemented as a method, apparatus or article of manufacture using standard programming and/or engineering techniques to produce software, firmware, hardware, or any combination thereof. The term "article of manufacture" as used herein refers to code or logic implemented in a tangible medium, where such tangible medium may comprise hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made to this configuration without departing from the scope of the present description, and that the article of manufacture may comprise any suitable information bearing medium.

In certain implementations, the embodiments may be included in a computer system including nonvolatile memory and a storage controller, such as a SCSI, Integrated Drive Electronics (IDE), Redundant Array of Independent Disk (RAID), etc., controller, that manages access to a non-volatile storage device, such as a magnetic disk drive, tape media, optical disk, etc. In alternative implementations, embodiments may be included in a system that does not include nonvolatile memory or a storage controller, such as certain hubs and switches.

In certain implementations, the embodiments may be implemented in a computer system including a video controller to render information to display on a monitor electrically coupled to the computer system including the host software driver and network controller, such as a computer system comprising a desktop, workstation, server, mainframe, laptop, handheld computer, telephone, etc. Alternatively, the features described herein may be implemented in a computing device that does not include a video controller, such as a switch, router, etc.

The foregoing description of various embodiments has been presented for the purposes of illustration. It is not intended to be exhaustive or to limit to the precise form disclosed. Many modifications and variations are possible in light of the above teaching.

What is claimed is:

1. A method, comprising:
  transmitting radio frequency (RF) signals using a radio frequency identification (RFID) transceiver to an RFID tag;
  receiving from said RFID tag, radio frequency (RF) signals by a receiver of said RFID transceiver in response to said transmitted RF signals;

converting said received RF signals;
sampling converted signals using a filter circuit configured in a first mode to have a first bandwidth, to sample a DC offset value of a first portion of said converted signals;
filtering a second portion of converted signals using said filter circuit configured in a second mode to have a second bandwidth narrower than said first bandwidth;
canceling said sampled DC offset value from said second portion of converted signals using said filter circuit configured in said second mode;
holding said sampled DC offset using said filter circuit configured in an intermediate mode after said first mode;
wherein said sampling, holding and filtering uses an alternating current (AC) coupling capacitor; and wherein said filtering comprises high pass filtering to block a portion of converted signals and to bypass a portion of converted signals wherein the bypassed signals have frequencies higher than the frequencies of the blocked signals;
wherein said sampling includes shunting one end of said capacitor to a first impedance using a shunt switch which is closed in said first mode; and
wherein said filtering includes coupling said end of said capacitor to an output having a second impedance greater than that of said first impedance, using a series switch which is closed in said second mode wherein said shunt switch is open in said second mode.

2. The method of claim 1, wherein said holding includes decoupling said end of said capacitor from said first and second impedances wherein said shunt and series switches are open in said intermediate mode.

3. The method of claim 1 wherein said sampling, holding and filtering uses a second alternating current (AC) coupling capacitor, wherein said sampling includes shunting ends of said capacitors to each other using a shunt switch which is closed in said first mode; wherein said filtering includes coupling said ends of each of said capacitors to an amplifier using series switches which are closed in said second mode wherein said shunt switch is open in said second mode; and wherein said holding includes decoupling said ends of said capacitors from each other and said amplifier wherein said shunt and series switches are open in said intermediate mode.

4. The method of claim 1 wherein said converting includes down converting which comprises mixing received RF signals with oscillating signals provided by a local oscillator.

5. The method of claim 1 wherein said transmitting includes:
transmitting unmodulated RF power signals using said RFID transceiver to initialize said RFID tag in said first mode wherein a portion of said received RF signals are received from said tag in response to said transmitted unmodulated RF power signals;
transmitting data in the form of modulated RF power signals using said RFID transceiver to said RFID tag in said intermediate mode; and
transmitting unmodulated RF power signals in said second mode using said RFID transceiver to an initialized RFID tag wherein a portion of said received RF signals include data in the form of modulated RF signals received from said initialized tag in said second mode.

6. A reader apparatus for use with an RFID tag, comprising:
a radio frequency identification (RFID) transceiver which includes an RFID transmitter adapted to transmit RF signals to said RFID tag; and an RFID receiver adapted to receive from said RFID tag, RF signals in response to said transmitted RF signals; wherein said receiver includes:
an input port adapted to receive said radio frequency (RF) signals from said RFID tag;
a down-converter coupled to said input port to convert said received RF signals;
a configurable high pass filter circuit coupled to said down-converter wherein said filter circuit is configurable to have a first bandwidth in a first mode, to sample a DC offset value of converted signals; and wherein said filter circuit is configurable in a second mode, to have a second bandwidth narrower than said first bandwidth and to filter a second portion of converted signals and cancel said sampled DC offset value from said second portion of converted signals wherein said filter circuit is configurable in an intermediate mode after said first mode, to hold said sampled DC offset, and wherein said filter circuit comprises a first alternating current (AC) coupling capacitor; and wherein said filter circuit is adapted to block a portion of converted signals and to bypass a portion of converted signals wherein the bypassed signals have frequencies higher than the frequencies of the blocked signals; and wherein said filter circuit further comprises a controller, a first impedance and a first shunt switch which is coupled to one end of said first capacitor, wherein said controller is adapted to control said first shunt switch to shunt said one end of said first capacitor to said first impedance by closing said first shunt switch in said first mode; and
an output having a second impedance greater than that of said first impedance, wherein said filter circuit further comprises a first series switch which is coupled to said end of said first capacitor, wherein said controller is adapted to control said first series switch to couple said one end of said first capacitor to said output having said second impedance by closing said first series switch in said second mode, and to control said first shunt switch to be open in said second mode.

7. The reader of claim 6, wherein said controller is adapted to open said shunt and series switches in said intermediate mode to decouple said end of said capacitor from said first and second impedances in said intermediate mode.

8. The reader of claim 6 wherein said output includes an amplifier and wherein said filter circuit further comprises a second alternating current (AC) coupling capacitor, a second shunt switch and a second series switch, wherein said wherein said controller is adapted to shunt said ends of said first and second capacitors to each other using said second shunt switch which is closed in said first mode; wherein said said controller is further adapted to couple said ends of each of said first and second capacitors to an amplifier using said first and second series switches which are closed in said second mode wherein said second shunt switch is open in said second mode; and wherein said controller is further adapted to decouple said ends of said first and second capacitors from each other and said amplifier wherein said shunt and series switches are open in said intermediate mode.

9. The reader of claim 6 wherein said down converter includes a local oscillator adapted to provide oscillating signals, and a mixer adapted to mix received RF signals with oscillating signals provided by said local oscillator.

10. The reader of claim 6 wherein said transmitter is adapted to transmit:
in said first mode, unmodulated RF power signals to initialize said RFID tag wherein a portion of said received RF signals are received from said tag in response to said transmitted unmodulated RF power signals;

in said intermediate mode, data in the form of modulated RF power signals to said RFID tag; and in said second mode, unmodulated RF power signals to an initialized RFID tag wherein a portion of said received RF signals include data in the form of modulated RF signals received from said initialized tag in said second mode.

11. A system, comprising:

a target object;

a radio frequency identification (RFID) tag embedded in the target object; and a radio frequency identification (RFID) reader having a radio frequency identification (RFID) transceiver which includes an RFID transmitter adapted to transmit RF signals to said RFID tag; and an RFID receiver adapted to receive from said RFID tag, RF signals in response to said transmitted RF signals; wherein said receiver includes an input port adapted to receive radio frequency (RF) signals; a down-converter coupled to said input port to convert said received RF signals; and a configurable high pass filter circuit coupled to said down-converter wherein said filter circuit is configurable to have a first bandwidth in a first mode, to sample a DC offset value of a first portion of said converted signals; said filter circuit is configurable in a second mode, to have a second bandwidth narrower than said first bandwidth and to filter a second portion of converted signals and cancel said sampled DC offset value from said second portion of converted signals; and said filter circuit is configurable in an intermediate mode after said first mode, to hold said sampled DC offset;

wherein said transmitter is adapted to transmit:

in said first mode, unmodulated RF power signals to initialize said RFID tag wherein a portion of said received RF signals are received from said tag in response to said transmitted unmodulated RF power signals;

in said intermediate mode, data in the form of modulated RF power signals to said RFID tag; and in said second mode, unmodulated RF power signals to an initialized RFID tag wherein a portion of said received RF signals include data in the form of modulated RF signals received from said initialized tag in said second mode.

* * * * *